United States Patent
Barinov et al.

(10) Patent No.: US 7,434,229 B2
(45) Date of Patent: Oct. 7, 2008

(54) METHOD FOR IMPROVING TEMPORAL CONSISTENCY AND SNAPSHOT RECENCY IN A MONITORED REAL-TIME SOFTWARE-REPORTING-APPLICATION ARCHITECTURE

(75) Inventors: Vitaly Y. Barinov, Walnut Creek, CA (US); Dmytro G. Balkin, Millbrae, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 575 days.

(21) Appl. No.: 10/210,702

(22) Filed: Jul. 31, 2002

(65) Prior Publication Data

US 2004/0025171 A1 Feb. 5, 2004

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 12/00 | (2006.01) |
| G06F 17/30 | (2006.01) |

(52) U.S. Cl. ...................... 719/318; 707/201
(58) Field of Classification Search ............... 719/318; 707/200–203, 1, 10; 715/500, 511, 760–762; 709/201–203; 712/28
See application file for complete search history.

(56) References Cited

U.S. PATENT DOCUMENTS

| | | | | |
|---|---|---|---|---|
| 5,471,629 | A * | 11/1995 | Risch | 707/201 |
| 6,425,016 | B1 * | 7/2002 | Banavar et al. | 719/310 |
| 6,691,097 | B1 * | 2/2004 | Saracco | 707/1 |
| 6,791,581 | B2 * | 9/2004 | Novak et al. | 715/744 |
| 6,950,850 | B1 * | 9/2005 | Leff et al. | 709/203 |
| 6,952,829 | B1 * | 10/2005 | Banavar et al. | 719/310 |
| 6,988,270 | B2 * | 1/2006 | Banavar et al. | 719/310 |
| 7,073,130 | B2 * | 7/2006 | Novak et al. | 715/744 |
| 2002/0087950 | A1 * | 7/2002 | Brodeur et al. | 717/124 |
| 2003/0115375 | A1 * | 6/2003 | Robison | 709/318 |
| 2003/0197726 | A1 * | 10/2003 | Weitzman | 345/744 |
| 2004/0073646 | A1 * | 4/2004 | Cho et al. | 709/223 |
| 2004/0210825 | A1 * | 10/2004 | Novak et al. | 715/500.1 |
| 2005/0210050 | A1 * | 9/2005 | Novak et al. | 707/100 |
| 2005/0210051 | A1 * | 9/2005 | Novak et al. | 707/100 |

OTHER PUBLICATIONS

Strom et al., "Concurrency Control and View Notification Algorithms for Collaborative Replicated Objects," Apr. 1997, IEEE, vol. 47, No. 4, pp. 458-470.*

* cited by examiner

*Primary Examiner*—Meng-Ai An
*Assistant Examiner*—Qing-Yuan Wu
(74) *Attorney, Agent, or Firm*—Central Coast Patent Agency, Inc.

(57) ABSTRACT

An object-oriented software application is provided for receiving updates that change state of an object model and reporting those updates to requesting users. The application includes a database application for storing data; an object model driver for writing updates into the database; a notification system for notifying about the updates; and, a plurality of external monitors for reading the updates. In a preferred embodiment the object model produces multiple temporal snapshots of itself in co-currency with received events, each snapshot containing associated update information from an associated event and whereupon at the time of occurrence of each snapshot coinciding with an event the notification system notifies the appropriate external monitor or monitors, which in turn access the appropriate snapshot, performs calculations thereupon if required and renders the information accessible to the users.

13 Claims, 5 Drawing Sheets

TransactionLog

| Version | Time Stamp | Actions | Reference Counter |
|---|---|---|---|
| ... | ... | ... | ... |
| 127 | 01/12/02 12:05 | {25,X,PROPERTY_CHANGED} | 3 |
| ... | ... | ... | ... |

400

ObjectHistory

| Oid | Reference to skip List |
|---|---|
| ... | ... |
| 25 | Ref to {14,47,127,160} |
| ... | ... |

METHOD FOR IMPROVING TEMPORAL CONSISTENCY AND SNAPSHOT RECENCY IN A MONITORED REAL-TIME SOFTWARE-REPORTING-APPLICATION ARCHITECTURE

FIELD OF THE INVENTION

The present invention is in the field of object-oriented data storage, access and reporting, especially regarding real-time reporting applications, and pertains particularly to methods for providing consistent temporal properties as well as snapshot recency for more accurate reporting and monitoring in association with instant time parameters.

BACKGROUND OF THE INVENTION

In the field of software development, a goal is to develop software applications that perform their stated functions accurately with the least amount of complex code and computation. Software development for real-time data reporting is particularly subject to inaccuracies related to timely reporting, especially when activity events occur many times over relatively short periods of time. A good example of this is currency exchange applications accessible through network connection, such as the Internet.

FIG. 1 is an exemplary line graph displaying exchange rate value over time for two specific currencies against the U.S. dollar, the Swiss Franc and the more-recently introduced Euro. The graph shows that the two separate currencies independently change in value over time thus affecting the rate of exchange with the U.S. dollar at any given point. Of course, clients wish to receive the best rate on exchange to maximize their spending power with the exchanged currency. The rate values do not actually produce a smooth curve rather they occur at specific time intervals or transactions over time.

In FIG. 1, (TX) represents a point in time when a client accesses an online system to initiate an exchange of one currency for another. At the point of time represented for the transaction, the Frank is trading at a higher rate against the U.S. dollar than the Euro. A dotted circle given the element number 101 represents a duration bubble for the time (TX). Within bubble 101 there may occur more than one transaction affecting a currency exchange order. Therefore, a typical exchange transaction may not achieve the best real-time quote information within the time frame of bubble 101.

FIG. 2 shows an expanded view of bubble 101 of FIG. 1. The client access to the system materializes at time 2 (T2), the transaction represented by point X. The client may whish to select the currency (Frank or Euro) that is the highest trading currency against the dollar. Perhaps the client wishes to exchange Euros for Franks or Franks for Euros. In any case, there have been four value changes registered within the time period of the client's transaction. TA1 and TA3 show the Franc sliding against the dollar while TA2 and TA4 show the Euro rising slightly against the dollar.

In order to get an honest rate of exchange for the exact point in time of the transaction, the system will have to perform some speculation at the moment of the quote because a state change has not occurred at the exact time T2.

What is clearly needed is an object-oriented, extendable system that can provide better temporal qualities in data reporting and response activities between clients and temporal database applications. Such a system would enhance accuracy and timeliness of reporting in temporal database environments associated with telephony networks, on-line stock trading systems, airline control operations, interest rate calculation systems, and so on.

SUMMARY OF THE INVENTION

In a preferred embodiment of the present invention an object-oriented software application for receiving updates that change state of an object model and reporting those updates to requesting users is provided, comprising a database application for storing data, an object model driver for writing updates into the database, a notification system for notifying about the updates, and a plurality of external monitors for reading updates. The application is characterized in that the object model produces multiple temporal snapshots of itself in co-currency with received events, each snapshot containing associated update information from an associated event and whereupon at the time of occurrence of each snapshot coinciding with an event the notification system notifies the appropriate external monitor or monitors, which in turn access the appropriate snapshot, performs calculations thereupon and renders the information accessible to the users.

In some preferred embodiments the database is a relational database, while in some others the database is an object database. In some embodiments updates are changes to properties of the object model and the object model represents a real-time event-driven system. Also in some embodiments the notification system includes a plurality of listener modules programmed to listen for specific updates. In some cases the listener modules are Java language modules embedded into the main kernel of the application. In other cases the listener modules may be held externally from the kernel but are interfaced thereto through application program interface.

In some embodiments all transactions are logged in a transaction log and all snapshot versions are maintained in object history until no longer needed at which time all information concerning the transaction is deleted from the database. In other embodiments multiple reads occur as a result of a single write, the reads bound by the information written.

In another aspect of the invention a method for providing temporal consistency and snapshot recency in a temporal data reporting and monitoring system is provided, comprising the steps of (a) generating an object model representing a event-driven environment and mapping the model to a database; (b) receiving events into the system, the events comprising updates to the object model; (c) writing the received events into the database in serial fashion updating the model; (d) creating a snapshot view of the model for each write at the time of occurrence and maintaining serial versions of the snapshots for multiple reads; (e) notifying appropriate ones of a plurality of external monitors at the occurrence of each snapshot; and (d) deleting all information stored about each snapshot from the database according to pre-defined expiration criteria.

In some embodiments of the method in step (a), the database is a relational database. Also in some embodiments, in step (a), the database is an object database. In step (b) the updates may be changes to properties of the object model and the object model represents a real-time event-driven system. In step (e) notification may be performed by a plurality of listener modules programmed to listen for specific updates. Also in step (e) the listener modules may be Java language modules.

In some embodiments, in step (a), the event-driven environment is a telephony environment and object model properties include one or more of end agents, end systems, routing rules, terminal locations, switch locations, call disposal rules and actions.

In yet another aspect of the invention an external plug-in monitor for receiving updated information about an object model, the updates occurring serially over time comprising a listener mechanism for detecting updates, an interface for enabling the listener mechanism to communicate externally, a viewer for viewing snapshots of the updated object model, the snapshots serialized according to update occurrence, and a rendering module for performing any required calculation on snapshots and communicating the results to a requesting user. The plug-in monitor is characterized in that the plug-ins can be programmed to handle property specific updates of the module to allow optimum customization for users requiring varied types of information.

In some embodiments the monitor grouped with like monitors to form part of a user interface. Also in some embodiments the listener mechanism is programmed to listen for specific updates, and the listener mechanism may be a Java language module. In some cases the updates are changes to properties of the object model and the object model represents a real-time event-driven system. Also in some cases the viewer may be automatically triggered to generate a view according to listener notification and associated event handling. The event-driven system may be a telephony system, and the telephony system may be a communication center. In preferred embodiments object model properties include one or more of end agents, end systems, routing rules, terminal locations, switch locations, call disposal rules and actions.

BRIEF DESCRIPTION OF THE DRAWING FIGURES

FIG. 4 is a block diagram illustrating a transaction log and history log for recording object versioning and data state in an object database (ODB) of FIG. 3.

DESCRIPTION OF THE PREFERRED EMBODIMENTS

The task of selective real-time monitoring and reporting in rapidly changing event-driven environments applies to a wide class of applications in many fields. These include stock trading, air-traffic control, telecommunications etc. In conventional system architecture all real-time monitoring functions are concentrated in one permanent module (application kernel).

It is a goal of the invention to provide an extendible application including plug-in modules that share function with the application kernel and communicate with the kernel by way of individual pre-defined interfaces. Another goal of the invention is to enhance performance in temporal consistency, snapshot recency and real-time response capability through multi-version concurrency control and transparent versioning. The methods and apparatus of the present invention are described in enabling detail below.

Figure 3:
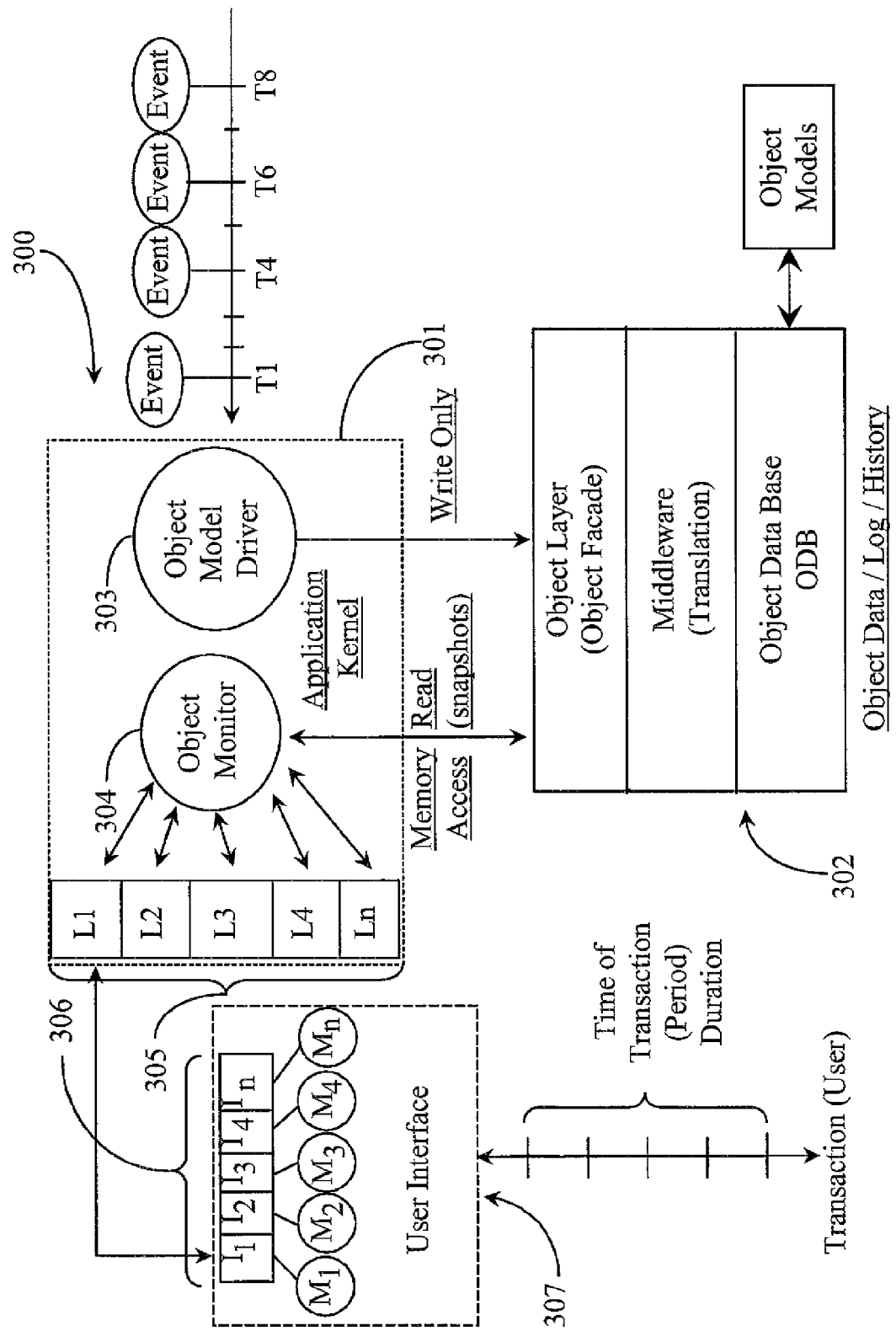
FIG. 3 is a block diagram illustrating logical components of an extendible software application architecture for real-time reporting according to an embodiment of the invention.

FIG. 3 is a block diagram illustrating logical components of an extendible software application architecture 300 for real-time reporting according to a preferred embodiment of the present invention. Application architecture 300 is an object-oriented application that may utilize a relational or other object-oriented database 302 including middleware for translation and an object layer for current object representation (facade).

Database 302 is a temporal database capable of providing temporal consistency. Temporal consistency means that any external access to a particular object model 308 constructed from data within ODB 302 within one read transaction will return co-occurred data, or current data updates as reflected by all of the most recent versions of the model 308. Otherwise any resultant action by a user based on the returned information may not have the absolute intended effect. One with skill in the art of relational databases will understand that temporal consistency implies the strictest level of transaction isolation, meaning transactions arc serializable.

A complete and whole object model contains a plurality of, in this case, monitored entities. In a preferred embodiment then, each entity or object belonging to the model has its own unique identifier or object identification (OID). One with skill in object modeling will also understand that each object or entity of the model may have its own set of attributes, which are properties. Such properties may be represented as scalar, meaning as atomic types including integer, string, or OID; or as vector, meaning groups of the atomic types or OIDs.

Entity relationships may exist in an object model and can be understood as one-to-one, one-to-many, or many-to-many, as is well known in object representation. One-to-one relationships between entities are represented by two active links, one per entity. To support a one-to-many or a many-to-many relationship collections of the appropriate references are stored in each appropriate entity involved in the relationship. In a preferred embodiment of the invention OIDs are used for identification.

Figure 1:
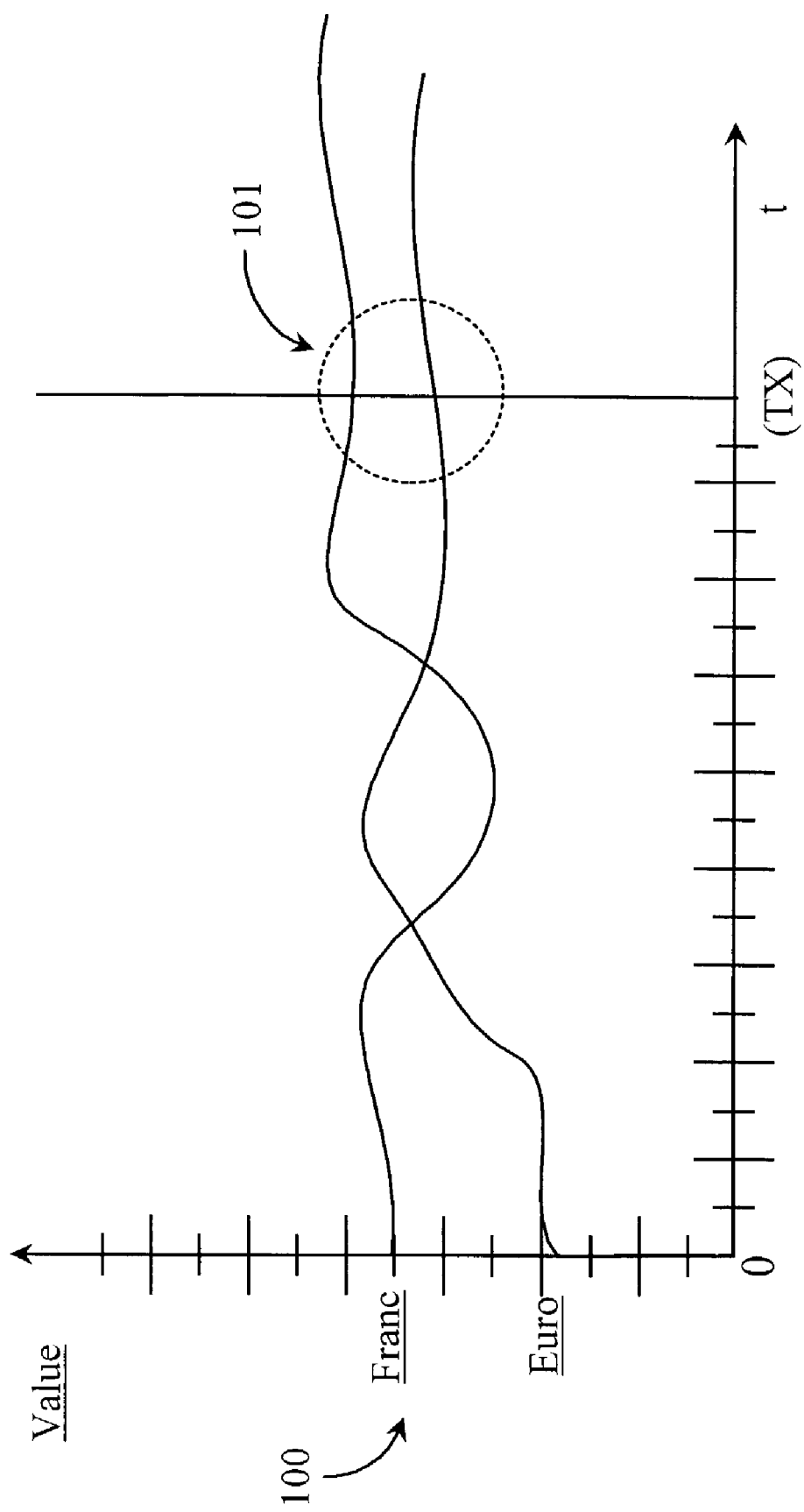
FIG. 1 is a graph exemplifying a typical currency exchange activity over time.
Figure 2:
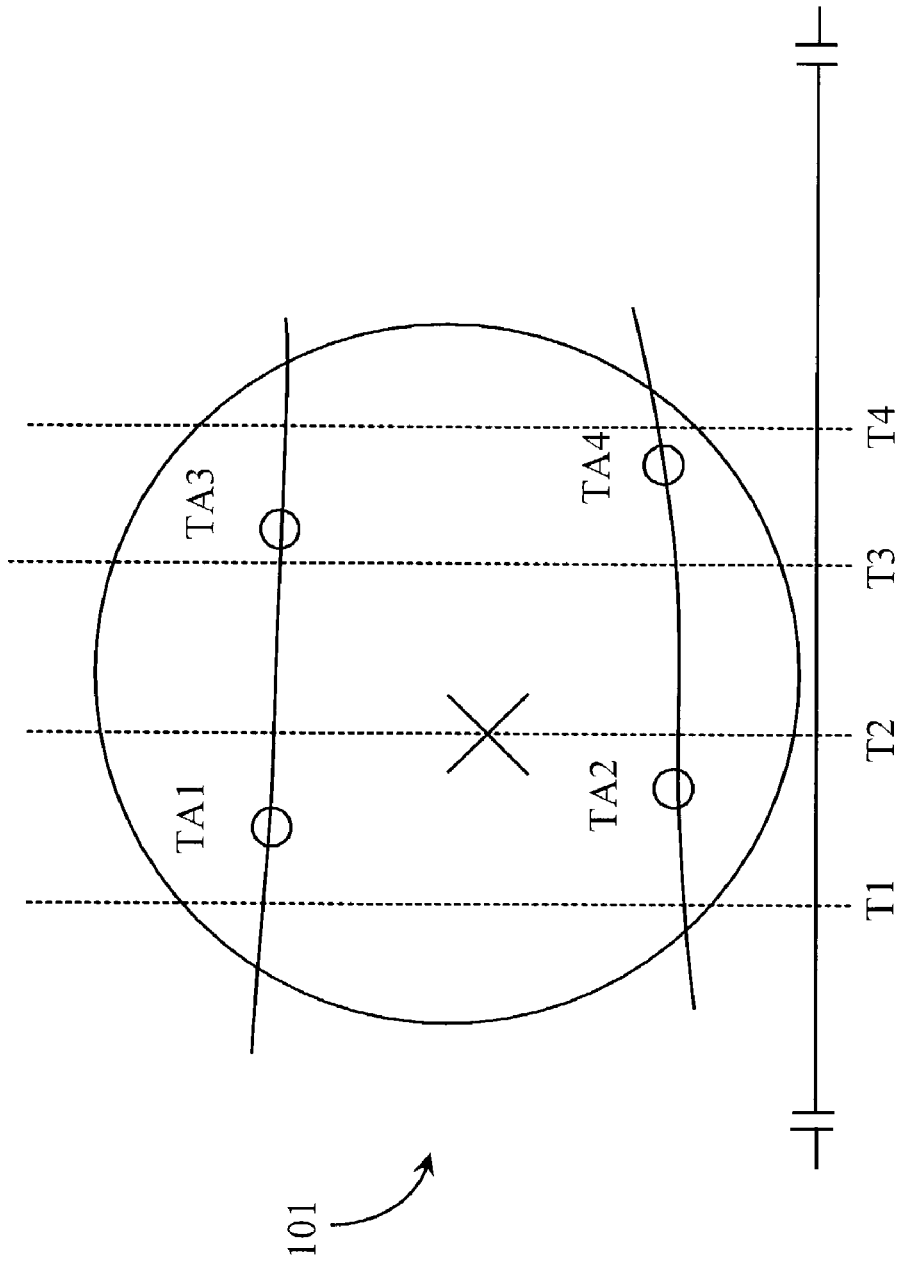
FIG. 2 is an exploded view of a section of the graph of FIG. 1 showing additional detail.

An object model driver 303 is provided within kernel 301 and is adapted to modify the object model according to external events that change state of the data represented by the object model. In this example, incoming events into the system are illustrated as events received at times T1, T4, T6, and T8. For a model representing currency exchange, used as an example of FIGS. 1 and 2 described with reference to the background section of this specification, an event represents a transaction affecting the state (value) of a particular currency. In another example, an event may represent an interest rate change related to a particular type of real estate loan provided by a specific bank.

Driver 303 is adapted as a write-only module (indicated by arrow) and is dedicated to writing the events into ODB 302, thus updating the object model in real time as the external events occur. The object layer acts as an adapter to the middle layer, which can be a known conventional layer such as COBRA. The middle layer maps the updates into the appropriate format and location in the database using one of several known object-to-relational mapping schemas.

Application kernel 301 contains a dedicated object monitor 304 that is adapted to perform memory accesses and read-only operations. Object monitor 304 is charged with maintaining the latest update of the complete object model. Therefore, in order to ensure that the object model presented by object monitor 304 is absolutely current, the frequency of memory access and read is set to be higher than the expected frequency of incoming events.

A plurality of extension plug-ins are provided to application 300 in a preferred embodiment of the present invention to interface with kernel 301 for the purpose of performing multiple and parameter-specific observations with respect to the latest object model rendering through monitor 304. The plug-ins function as external monitors that are capable of performing computations on the model. The plug-ins in this example comprise listener modules 305 (L1-Ln), Interface adaptors 306 (I1-In) and actual monitors designated herein as monitors M1-Mn.

Listeners 305 are, in a preferred embodiment, provided as software interface modules and notification mechanisms operating within kernel 301. In a preferred embodiment, listeners 305 are Java-language modules, but in alternate embodiments, other programming languages can be used to create listeners 305. Furthermore, in alternative embodiments listeners 305 may be external from kernel 301, but interfaced for communication therewith. Listeners 305 are pre-programmable, and are preferably programmed to listen for updates to a specific portion (entity or entities) of an object model. Listeners 305 can also preferably each be activated or de-activated in function from an external interface. Listeners 305 may also be added to in terms of adding new listeners or deleted from in terms of deleting one or more listeners from the group.

For each listener 305 there is provided a separate interface adaptor 306 (I1-In). Interface adaptors 306 are grouped into a portion of a user interface 307. User interface 307 may be a browser-enhanced interface, a plug-in to an actual browser application, or a standalone software interface supported by hardware. Interface adaptors 306 each connect to a monitoring module, those modules illustrated in this example as M1-Mn.

Monitor modules M1-Mn are part of the interface and are user-activated, or activated through system notification in some cases. In the case of system activation, a notification mechanism divided in responsibility for each mechanism is provided with kernel 301 and adapted to notify listeners of incoming events that are useful to them. A user-initiated transaction on system 300 is represented immediately below user interface 307 as a time period or duration of time. This time-of-transaction period quantifies the maximum amount of time dedicated to support user initiation, system execution, and return of data results.

In practice of the present invention in a preferred embodiment, as Events T1-T8 enter queue, object model driver 303 accesses ODB 302 using the middleware and object facade. As each event is parsed, the object model performs a memory access and write transaction entering the pertinent information into the database. It is important to remember that each event is typically an update to a specific portion of the object model and not necessarily the entire object model. As events are written into ODB 301, the object changes in terms of properties/actions/attributes (versioning). An example of a single event for our example of currencies is that of a single rate change affecting value of one of a plurality of currencies, which are separate entities of the object model.

Object monitor 304 continually accesses and reads the object model and preserves each most-recent snapshot view until it is no longer prudent to retain it. The object model must return upon request the latest picture or view. This requirement is measured in time and described by a term known in the art as state recency. State recency is measured in views or pictures over time, the longer the time period from time of access to the latest view, the less valuable or accurate the view is likely to be.

Transaction duration is an issue where transactions must be completed by their deadlines. For example, if a user accesses the system for update and the transaction times out before a view can be acquired then the user must perform a re-access of the system to try again. In a preferred embodiment, the deadline for transaction periods to expire is lengthened to reduce the frequency of aborted transactions and re-starts. In one embodiment transaction periods are devoid of deadlines altogether.

Each external monitor M1-n has an interface I1-n as previously described above. Therefore, each external monitor (plug-in) can add or remove listeners to any specific property of any object in the object model. In practice, when an event such as event T1 causes a change to one or more properties in the object model the appropriate listener or listeners L1-Ln are notified and appropriate event handlers are called. In event handling, each listener L1-Ln can access the entire object model for read-only at the time the event or events occurred. In another embodiment, listeners L1-Ln may read only assigned portions of the object model with resolution down to a single property. The event handlers (not shown) perform calculations governed by various algorithms to process the events that have occurred.

In some cases incoming events will cause property changes to cascade over more than one property. Therefore, it is possible that multiple objects will be involved in event handling calculations. It is important to note herein that event-handling calculations are applied to monitored views of the object model and not to the model itself. There is no write capability to the object model through the external plug-in modules.

If third party code is used to access the object model for read, the set of accessed objects will be unknown in advance. Therefore, the entire object model must be rendered temporally consistent. This is accomplished by maintaining multiple snapshots in co-currency. In one embodiment where third party code applies, an accessing user may use standard conventions such as "create view" to pre-select a set of objects from the model for view only. Temporal consistency is guaranteed for the resulting view only.

Most computations performed on views use object states as input variables. As described previously, these states change discreetly rather than continuously and can be described in terms of finite automata. Losing one state in a train of transitions can lead to an incorrect result. Therefore, absolute state recency is required which can be accomplished only if the computations are performed only on snapshots that are actual for the times the events occurred. When these events do occur the object model itself produces and preserves a snapshot per event that is held ready for future access. When a new snapshot occurs the appropriate listener L1-Ln is notified.

In order to reduce memory space required for processing, snapshots resulting from events are not mirrored from actual data, but are constructed from the data without significant loss of time. Co-occurred objects in the object model contain, in a preferred embodiment, OID-type links to each other. Therefore, only one vertex of the connected component described in graph is required to attain access to the entire component.

The functions of each plug-in extension are executed in separate process threads. This prevents interruptions to kernel 301 and cross extension interference. Read access to the object model is performed by the extensions on a concurrent basis with multiple processes enabled to occur simultaneously. In this example, high-level concurrency is based on known multi-version concurrency control (MVCC) techniques. Maintenance algorithms supporting and enabling functions of the system according to embodiments of the invention rely on MVCC techniques.

In a preferred embodiment, calculations on snapshot versions are performed transparently for extensions operating on concurrent versions that are the same. This preferred requirement simplifies the code for application program interface (API) and simplifies multiple versioning maintenance, because correct work of extensions is not relied upon. Prior-art implementations of MVCC often are limited by a constant (number of versions), typically 2. However, in a preferred embodiment of the invention concurrency is not the only issue. Therefore, the number of versions being worked on cannot be restricted, as this could compromise consistency of computation.

Extensions can add or remove listeners dynamically so no version (snapshot) of an object model can be discarded as long as a read transaction is occurring on a previous version, accept in special circumstances described further below. The reasoning is that the extensions working on the previous version may still add or remove listeners, which would be activated for the next version. An analogy describing this case would be that each extension is being shown a movie of versions or snapshots pre-selected by some criteria. The extensions watch each movie snapshot by snapshot.

It will be apparent to one with skill in the art that the method and apparatus of the invention provides the essential properties for successful function. These are real-time response, read-only access to object model by extensions, temporal consistency, absolute snapshot recency, listener-based change notification, and transparent versioning of object model state with an unlimited number of active versions.

It will be understood by one with skill in the art that the extensions including M1-n and I1-n are not granted unfettered access to the object model directly but are delegated such access through an interface to kernel 301, which accesses the object model through the appropriate interface to ODB 302. A variety of different interfacing components may be used depending on the capability and architecture of ODB 302 including many adopted mapping schemas. There therefore exists a number of architectural variances without departing from the spirit and scope of the present invention.

FIG. 4 is a block diagram illustrating a transaction log 400 and history log 401 for recording object versioning and data state in the ODB of FIG. 3. It is noted herein that the permanent and major block of the entire system is application kernel 301 (FIG. 3). Its main responsibilities include, but are not limited to:

Communication with external data sources.
Performing write transactions on the object model at each incoming event.
Computation of a basic set of statistical indicators on the object model.
Communication with plug-in modules (extensions) through the appropriate interfaces and,
Reporting statistics to the clients.

The extensions are variable components of the system whose duties include, but are not limited to:

Communication with kernel 301 through interfaces (I1-n) including the ability to add or remove listeners (notification handlers) and receiving events about object model changes.
Performing read transactions on the object model wherein the extension is bound by the changes and,
Computation of custom statistics.

Transaction log 400 has 4 vertical columns labeled, reading from left to right, Versions, Time Stamp, Actions, and Reference Counter. Object History Record 401 has 2 vertical columns labeled, reading from left to right, OID and Reference to Skip List.

Referring now to Log 400, the column labeled Version lists the serial versions that have been or are being worked on. Versions are numbered and a visible version of an object model is given the number 127 in this example. The column labeled Time Stamp tells when a particular version was created as a result of an incoming event that modified a property or properties of the object model lending to the instant version.

The column labeled Actions lists notifications of change. In this example, {25, X, PROPERTY_CHANGED} wherein PROPRETY_CHANGED is the action, X is the property, and 25 is the object Id number (OID). The next column labeled Reference Counter lists the reference number of versions to support version discarding when a particular (oldest) version is no longer needed. When the number (3) in this example resolves to 0 then all information regarding that view should be deleted from the object database.

Transaction Log 400 reflects activity of the application kernel and the versions maintained by the object model Log 400 does not reflect activity of the extensions in computing and reporting changes to users.

Referring now to Object History Log 401, the first column lists the object identification (OID) and the second column lists reference version numbers of views associated with the object. With any given object model, statistics can be computed according to activity and history so that they can be used to fine tune frequency of access of the object model and optimize listeners for event notification.

The exact system parameters will depend in part of what the object model represents. Parameters for a simple currency exchange service may be entirely different than that of the operation of air traffic control. The system of the invention is, in a preferred embodiment, implemented in the real-time environment of a telecommunications system wherein the object model is an event flow routing and handling model. Properties of the model may include end agents, end systems, routing rules, terminal locations, switch locations, call disposal rules and actions, and the like. In the case of implementation in a state-of-art communication center, clients using plug-ins may be administration personnel monitoring event activity, a routing system monitoring real-time presence and availability information, or even clients of the center monitoring availability or presence information using third-party software including a user-friendly interface.

Figure 5:
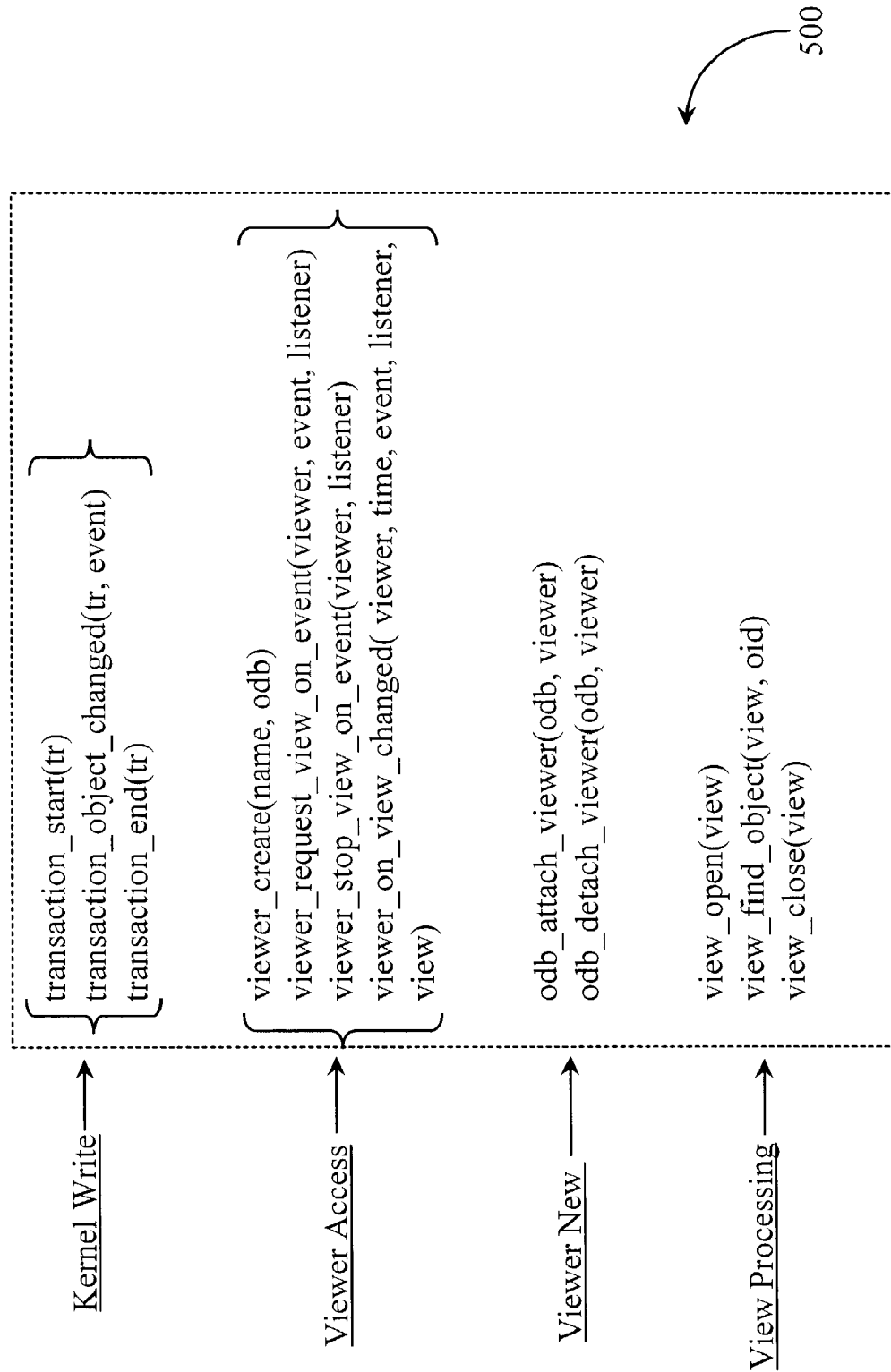
FIG. 5 is an example of procedure hierarchy for working with the ODB of FIG. 3.

FIG. 5 is an example of procedure hierarchy for working with the ODB of FIG. 3. In this example, activity of the application kernel writing (Kernel Write) to the OBD begins with a transaction start operation (transaction_start (tr). This activity reflects an incoming event that will change the object model in some way and the kernel notifying the database of an impending write. The kernel then performs the write, adding the update by invoking transaction_object_changed (tr, event). At the end of the write or when the write is finished the transaction is closed by invoking the method transaction_end (tr). This just-described command sequence describes the function of the kernel writing an update into the ODB (302) as a result of receiving an event containing the change data.

A custom viewer object must be provided and implemented for each particular application. To instantiate a viewer the method viewer_create(name.odb) is called. A viewer can request a listener to notify of an ODB change (view) of an event using the method vewer_request_view_on_event (viewer, event, listener). In this case the activated listener, which is a notification mechanism is a parameter of the command.

A viewer can also stop a listener by using the method viewer_stop_view_on_event(viewer,listener). A single method viewer_on_view_changed( viewer, time, event, listener, view) must be implemented to decide how to further work with a view once it is obtained.

When a new extension is plugged into an application a custom viewer object is first instantiated and is then attached to the ODB using the command odb_attach_viewer(odb, viewer). Each extension may have multiple listeners associated with a same event. When an event of interest takes place, the method viewer_on_view_changed of the viewer is called which results in a newly created view as one of its arguments. It is up to the plug-in extension what to do next with that particular view in terms of computation.

The viewer is notified of the change event through the appropriate listener and notification handler. The viewer is not assumed to be a third-party code in this example. Upon request, the ODB attaches or detaches from a viewer-odb_attach_viewer(odb,viewer)-odb_detach_viewer(odb,viewer). When it is appropriate, more particularly at the time of event, the method view_open(view) must be called followed by the series of calls to view_find_object(view,oid) to get access to an object model snapshot at the moment of time the view was created. This function occurs at the moment that the corresponding event occurred. The command to close a view is view_close_(view).

In practice, an extension may add listeners for future views while working with an older view. Given, for example, 4 events incoming into the system over real time, an extension can be working on the first event (t1) and simultaneously set a listener to t2. Snapshots t3 and t4 may arrive before the extension begins working on t2. Listeners may be dynamically added for t3 and t4 is applicable. All snapshots are retained until they are no longer relevant at which time they and any associated information is discarded.

The method of database access supports a single type of query. Get version of object OID valid at time t (version N). In the language of temporal database the query type referred to is known as a pure time-slice query. As described above, the objects are interlinked through OID-type. Therefore, more general non-pure time-slice-queries need not be supported.

In a preferred application, the database must accept added versions and discard non-applicable (old) versions. This can be accomplished automatically within the database in a transparent fashion. The object database is required to be an active database in the sense that it must trigger notification whenever any of the properties of the object model change. In any given moment of time there is at most a single write transaction and multiple read transactions running concurrently.

Estimation of Time/Space Costs

By keeping the algorithms basic and simple, the time and space parameters required by the entire system can be dramatically reduced. For example, to search for an object V of a particular OID within the ODB some basic steps are required. One is finding the ODB key that equates to the OID in object history, which is O(1). Then the system searches for the particular version within the skip-list, which is O)log Nvo)). Nvo is equal to the average number of versions existing per object as identified by Nvo=Ntotal/No where Ntotal is equal to the average total number of present versions of No—total number of objects (Nvo). The success of the just-described method depends directly on how quickly versions are discarded, which in turn depends upon how fast (processing) the extensions operate.

A write transaction causes insertion of a corresponding transaction record into the transaction log, which is identified as O(1) and insertion of the object versions generated by the transaction into the object history identified as Nat*O(1) where Nat is equal to the number of actions per transaction. Nat is typically small on the order of $\leq 2$. The parameter is limited by a large enough constant the size depending upon the particular object model.

To discard an old version of an object from the ODB, the corresponding transaction record is deleted from the transaction log, which is O(1). Similarly, the object versions related to actions in the transaction record are deleted from the object history, which is Nat*O(log Nvo). Using the logic presented above, the complexity of deletion is expressed as O(log Nvo). The inserted table illustrates the complexity of each function.

| Operation | Time Complexity |
|---|---|
| Search | O(log $N_{vo}$) |
| Insert | O(1) |
| Delete | O(log $N_{vo}$) |

Time Complexity of Operations on Objects Database

With regard to space cost estimations it is noted that the ODB stores only images and not internal objects themselves. The images are smaller in size than corresponding objects. The average size of an object image is expressed by $S_{im}=\alpha S_o$ where $S_o$ is the average size of actual object dependent on $\alpha<1$.

As was described further above, Ntotal defines the total number of present object versions.

If Ntotal=O(f($N_o$)) then the number of maintained versions grows as f($N_o$) where $N_o$ is total number of objects. Then average total space costs are O($\alpha$*f($N_o$)*$S_o$). If object versions are short-lived enough (which implies good balance between the frequency of write transactions and average speed of notification-processing in extensions), it can be assumed that f($N_o$)=O($N_o$) and total space costs in this case are O($N_o$*$S_o$)≈O($S_{total}$) where $S_{total}$ is the total size of internal object model with no multi-versioning support.

If the frequency of write transactions is extremely high and there exists a particularly slow running read transaction and if all newer snapshots generated by the write transactions are preserved until the older ones are used by the slow running read transaction then space may become limited. To resolve this case scenario, slow running read transactions may be aborted if the amount of space used exceeds some pre-defined acceptable threshold.

Standard Data Structure

The following code provides the standard data structure used by the system of the invention:

list
count
list_add_item(list, item)
list_remove_item(list, item)
hash
count
[key]-access to value by key
hash_add_key(hash, key)
hash_delete_key(hash, key)
hash_find_key(hash, key)
skip_list
count
skip_list_insert_key(skip_list, key, value)
skip_list_remove_key(skip_list, key)
skip_list_find_maxmin(skip_list, key_)-find maximum key<=key_

Structures and Procedures

The following code describes structures and procedures used by the system of the invention:

```
struct object
   oid: number
endstruct struct prop_desc
   name: string
   value: variant
```

```
    endstruct struct obj_desc
        oid: number
        version: number
        props: list of prop_desc
        deleted: boolean
    endstruct struct action
        type: of { UPDATE, OBJECT_CREATED, OBJECT_REMOVED }
        oid: number
        prop_name: string
        obj_desc:obj_desc
    endstruct struct transaction_record
        actions: list of action
        version: number
        time: time
        counter: number
    endstruct struct transaction
        time: time
        tr_record: transaction_record
    endstruct
```

```
struct trigger
    listeners: hash of hash of listeners
    action: action
endstruct struct viewer
    odb: odb
    name: string
endstruct viewer_on_view_changed( viewer, time, action, listener, view) -- abstract method struct odb
    transaction_log: hash of transaction_record
    obj_history: hash of skip_list
    triggers: list of trigger
    views: hash of list of views
    viewers: hash of viewer
    version: number
    oldest_version: number
endstruct struct view
    status: of { PENDING, OPENED, CLOSED, CANCELLED, DISCARDED }
    owner: viewer
    odb: odb
```

```
    tr_record: transaction_record
    action: action
    create_time: time
    open_time: time
    close_time: time
endstruct transaction_start( tr )
begin
    tr.tr_record := new transaction_record( tr.odb.current_version )
end transaction_object_changed( tr, action )
begin
    list_add_item( tr.tr_record, action )
end transaction_end( tr )
begin
    odb_end_transaction( tr )
end odb_end_transaction( odb, tr )
begin
    tr.tr_record.time := CURRENT_TIME
    hash_add_key( odb.transaction_log, odb.version, tr.tr_record)

foreach action in tr.record.actions
```

```
        odb_insert_version( odb, action.object.oid, odb.version, odb.object)
    endfor foreach action in tr.record.actions
        foreach trigger in odb.triggers
            if( trigger.action = action )
                odb_trigger_fire( odb, trigger, tr.tr_record )
            endif
        endfor
    endfor inc odb.version
end odb_trigger_fire( odb, trigger, tr_record )
begin
    foreach viewer in trigger.listeners.keys
        foreach listener in trigger.listeners[viewer]
            view := create_view(odb, viewer, tr_record, trigger.action)
            viewer_on_view_changed( viewer, CURRENT_TIME, trigger.action,
            listener, view)
        endfor
    endfor
end odb_drop_version( odb, tr_record )
begin
    hash_delete_key( odb.transaction_log, tr_record.version )
```

```
        foreach action in tr_record.actions
            odb_remove_version( odb, actions.oid, tr_record.version )
            delete action
5       endfor odb.oldest_version := tr_record.version+1
        delete tr_record
    end
10
    odb_add_listener( odb, action, viewer, listener)
    begin
        found := 0
        foreach trigger in odb.triggers
15          if( trigger.action := action )
                trigger_add_listener( trigger, viewer, listener)
                found := 1
                break
            endif
20      endfor if( found := 0 )
            trigger := create_trigger( action )
            odb_add_trigger( odb, trigger )
25      endif trigger_add_listener( trigger, viewer, listener )
    end
```

```
odb_remove_listener( odb, action, viewer, listener)
begin
    odb_remove_listener2( odb, action, viewer, listener)
    views_list := odb.views[ viewer ]
    if( views_list = null ) return foreach view in views_list
        if( view.status = PENDING && view.action = action )
            view_cancel( view )
        endif
    endfor
end odb_remove_listener2( odb, action, viewer, listener)
begin
    foreach trigger in odb.triggers
        if( trigger.action = action )
            trigger_remove_listener( trigger, viewer, listener )
            break
        endif
    endfor
end odb_remove_viewer_listeners( odb, viewer )
begin
    foreach trigger in odb.triggers
        trigger_remove_viewer_listeners( trigger, viewer )
```

```
        endfor
    end odb_register_view( odb, view )
5   begin
        inc view.record.counter
        view.create_time := CURRENT_TIME views_list := odb.views[ view.owner ]
10      if( views_list = null )
            views_list = new list
            list_add_item( views_list, view)
            odb_add_views( odb, view.owner)
        endif
15  end odb_unregister_view( odb, view)
    begin
        view.status := DISCARDED
20      dec view.record.counter views_list := odb.views[ view.owner ]
        list_remove_item( views_list, view )

25      if( views_list.count = 0 )
            delete views_list
            odb_remove_views( odb, view.owner)
        endif
```

```
            if( view.record.counter != 0 )
                return
            endif 5
            for i := odb.oldest_version to odb.version-1
                tr_record := odb.transaction_log[i]
                if( tr_record.counter = 0 )
                    odb_drop_version( odb, tr_record )
10              else
                    break
                endif
            endif 15      odb_insert_version( odb, oid, version, obj_desc )
        begin
            obj_ver_skip_list := odb.obj_history[ oid ]
            if( obj_ver_skip_list = 0 )
                obj_ver_skip_list := new skip_list
20              hash_add_key( odb.obj_history, obj_ver_skip_list )
            endif
            skip_list_insert_key( obj_ver_skip_list, version, obj_desc )
        end 25      odb_find_version( odb, oid, version )
        begin
            obj_ver_skip_list := odb.obj_history[ oid ]
            if( obj_ver_skip_list = 0 ) return 0
```

```
        return skip_list_find_maxmin( obj_ver_skip_list, version )
    end odb_remove_version( odb, version )
 5  begin
        obj_ver_skip_list := odb.obj_history[ oid ]

if( obj_ver_skip_list.count = 1 )
            obj_desc := skip_list_find_maxmin( obj_ver_skip_list, version )
10          if( obj_desc.deleted = true )
                skip_list_remove_key( obj_ver_skip_list, obj_desc.version )
                delete obj_desc
            endif
        else
15          obj_desc := skip_list_remove_key( obj_ver_skip_list, version )
            delete obj_desc
        endif if( obj_ver_skip_list.count = 0 )
20          delete obj_ver_skip_list
            hash_delete_key( obj_history, oid )
        endif
    end 25  odb_attach_viewer( odb, viewer )
    begin
        hash_add_key( odb.viewers, viewer, viewer )
    end
```

```
odb_detach_viewer( odb, viewer )
begin
    hash_delete_key( odb.viewers, viewer )
    odb_remove_all_viewer_listeners( odb, viewer )
end trigger_add_listener( trigger, viewer, listener)
begin
    listeners := trigger.listeners[viewer]
    if( listeners = 0 )
      listeners := new hash
      hash_add_key( listeners, viewer, listeners )
    endif
    hash_add_key( listeners, listener, listener)
end trigger_remove_listener( trigger, viewer, listener )
begin
    listeners := hash_find_key( trigger.listeners, viewer)
    if( listeners != 0 )
      hash_delete_key( listeners, listener)
      if( listeners.count = 0 )
        hash_delete_key( trigger.listeners, viewer)
      endif
    endif
end
```

```
         trigger_remove_viewer_listeners( trigger, viewer)
         begin
           listeners := hash_find_key( trigger.listeners, viewer)
           if( listeners != 0 )
  5          delete listeners
             hash_delete_key( trigger.listeners, viewer)
           endif
         end 10      create_view( odb, viewer, tr_record, action)
         begin
           view := new view
           view.odb := odb
           view.owner := owner
 15        view.tr_record := tr_record
           view.action := action
           view.status := PENDING
           odb_register_view( odb, view)
         end
 20 view_cancel( view)
         begin
           view.status := CANCELLED
           odb_unregister_view( view.odb, view )
 25      end view_delete( view )
         begin
```

```
       if( view.status = PENDING )
         odb_unregister_view( view.odb, view )
       endif
     end view_open( view )
     begin
       view.status := OPENED
       view.open_time := CURRENT_TIME
     end view_close( view )
     begin
       view.status := CLOSED
       odb_unregister_view( view.odb, view )
     end view_find_object( view, oid )
     begin
       return odb_find_version( view.odb, oid, view.tr_record.version )
     end viewer_create(name, odb)
     begin
       viewer := new viewer
       viewer.name := name
       viewer.odb := odb
     end
``` viewer_request_view_on_action( viewer, action, listener )

begin odb_add_listener( viewer.odb, viewer, listener)

end viewer_stop_view_on_action( viewer, listener )

begin odb_remove_listener( viewer.odb, action, viewer, listener )

end

Construct/Delete/Current time representations are shown below:

Construction, deletion new - construction delete - desctruction

CURRENT_TIME - current time

It will be apparent to the skilled artisan that the system of the present invention can be applied using a wide variety of database and middleware schemas as well as with varying mapping schemas for database representation to object oriented representation and the reverse order without departing from the spirit and scope of the present invention. The use of multiple plug-ins enables optimum customization of applications for varying degrees of user interest. While a main application is operating and concerned with whole model update, plug-ins may be programmed to listen for only a portion of the entire model for specific updates of user interest. It will also be apparent that the code provided as disclosure herein is largely exemplary, and code to accomplish the purposes within the spirit and scope of the invention may be provided in various ways.

The method and apparatus of the invention is applicable to a wide variety of embodiments wherein real-time temporal database reporting is practiced. Telephony centers, Stock trading terminals, Mortgage Brokerages, Loan Offices, Gaming Operations, Air Traffic Control operations, and Currency Exchange operations make up just some of the real-time temporal services that could benefit from the system of the present invention. Therefore, in light of the unlimited applications that could benefit from the system of the invention, the methods and apparatus of the invention should be given the broadest possible scope under examination of the claimed portion thereof. The spirit and scope of the present invention should be limited only by the claims that follow.

What is claimed is:

1. A processing system including a machine-readable medium having stored thereon computer executable code, the computer code comprising:
    an object model;
    an object model driver receiving change information events pertinent to objects in the object model, and writing those changes to a database;
    an object monitor independent from the object model driver, performing periodic sequential successive reads of the object model, the frequency of reads set to be higher than an expected frequency of the change information events incoming to the object model driver and retaining each read for a period as a snapshot of the object model;
    a plurality of listener modules, individual ones pre-programmed to view successive snapshots produced by the object monitor, and to listen for changes to specific objects; and
    user-activated monitors accessing one or more individual listener modules through interfaces;
    wherein users are informed through the monitors of values and changes in values of the specific objects the listener modules are programmed to listen for, according to the most recent snapshot provided by the object monitor.

2. The system of claim 1 wherein the object model driver is write-only with the object model.

3. The system of claim 1 wherein the object monitor is read-only with the object model.

4. The system of claim 1 wherein the change information events are changes to properties of the object model and the object model represents a real-time event-driven system.

5. The system of claim 1 wherein the listener modules are Java language modules.

6. The system of claim 1 wherein all snapshots are maintained in object history until no longer needed at which time all information concerning the transaction is deleted from the database.

7. The system of claim 1 wherein the successive reads occur as a result of a single write, the reads bound by the information written.

8. The system of claim 1 wherein each user-activated monitor is external to the system and each monitor can add or remove listeners for any object or group of objects in the model.

9. A method for updating users concerning changes to objects in a model, comprising steps of:
    (a) writing incoming object changes to the model by a write-only model driver;
    (b) monitoring the model by a read-only object monitor separate from the model driver;
    (c) producing sequential snapshots of the model by the object monitor according to sequential reads the frequency of the sequential reads set to be higher than an expected frequency of the writes in step (a);
    (d) monitoring the snapshots for specific object changes by individual listener modules programmed to listen for changes to specific objects in the model; and
    (e) providing values and changes in value of the specific objects to individual monitors interfaced to individual ones of the listener modules.

10. The method of claim 9 wherein the objects are part of an object model representing a real-time event-driven system.

11. The method of claim 9 wherein the listener modules are Java language modules.

12. The method of claim 9 wherein all snapshots are maintained in object history until no longer needed at which time all information is deleted.

13. The method of claim 9 further adding a step wherein each monitor adds or removes listeners for any object or group of objects in the model.

* * * * *